July 28, 1931.  O. L. HASTINGS  1,816,527
PUMP PISTON
Filed Nov. 14, 1929  2 Sheets-Sheet 1
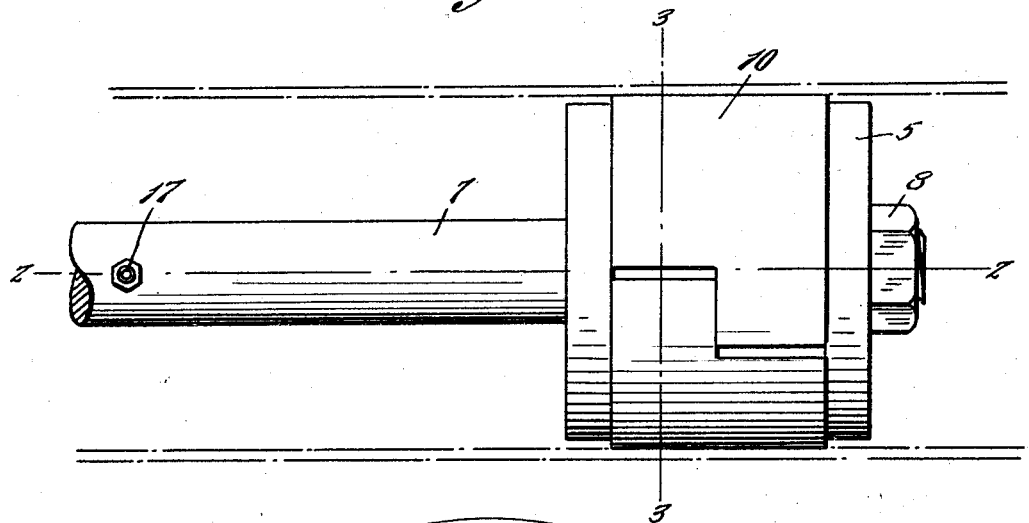
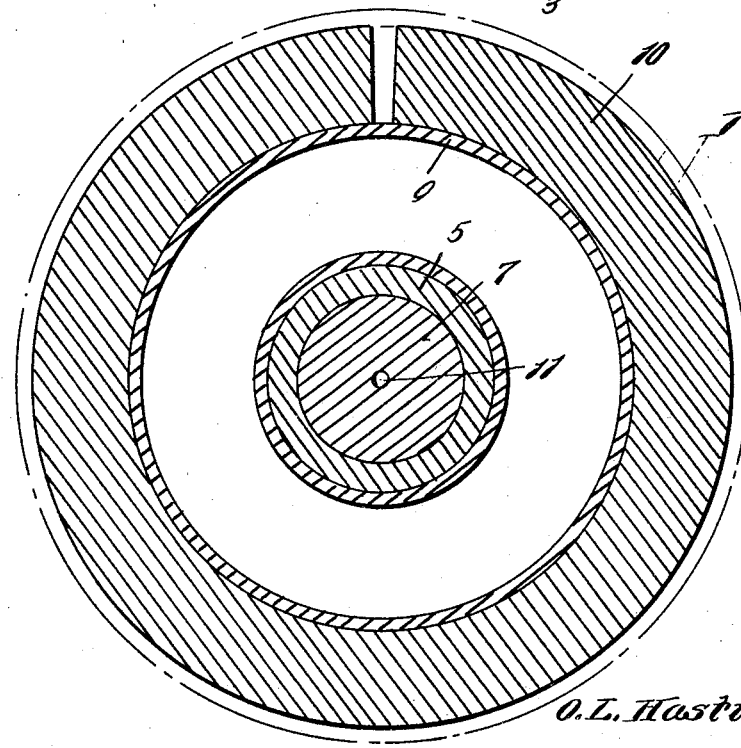
Inventor
O. L. Hastings
By Clarence A. O'Brien
Attorney

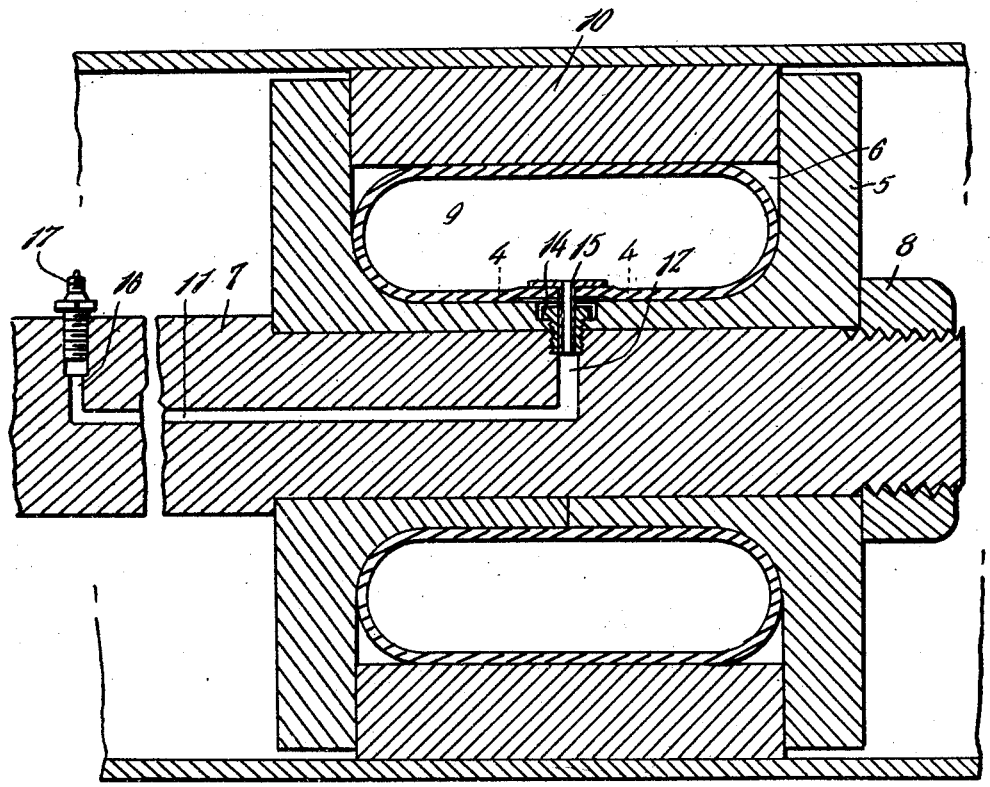
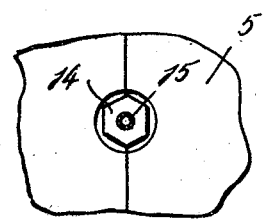

Patented July 28, 1931

1,816,527

UNITED STATES PATENT OFFICE

ODIE L. HASTINGS, OF SHREVEPORT, LOUISIANA

PUMP PISTON

Application filed November 14, 1929. Serial No. 407,091.

The present invention relates to pump pistons and has for its prime object the provision of means for preserving the wear and tear on bearings and valves of the pump caused by the loss of suction in the cylinder when the piston has worn to a lesser gauge than the cylinder lining.

Another very important object of the invention resides in the provision of a piston that can be used for a longer period of time without wearing below the gauge of the liner by the use of a hollow rubber piston expanded by a pressure exerted from within the hollow piston, and the pressure being applied by gases, liquid or mechanical means, and being independent of the pressure in the cylinder while in motion, unless such a pressure be taken from the cylinder and charged back into the hollow piston by way of a duct passing through the piston rod.

Another very important object of the piston resides in the provision of means to permit the expansion of the piston to the gauge of the cylinder liner taking up the loss in diameter of the piston caused by the wear from friction and storing and therefore keeping the pump from losing suction as is very common with the present type of piston now in use.

This invention accordingly consists in the features of construction, combination of parts, and in the unique relations of the members, and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:

Figure 1 is a side elevation of the piston embodying the features of my invention, Figure 2 is a longitudinal section taken on the line 2—2 of Figure 1, Figure 3 is a transverse section taken substantially on the line 3—3 of Figure 1, and Figure 4 is a detail section taken substantially on the line 4—4 of Figure 2.

Referring to the drawings in detail it will be seen that numeral 5 denotes the body of a piston formed with an annular groove 6 of relatively deep and wide proportion. A piston rod 7 is engaged with the body 5 in the usual or any preferred manner, being herein shown as passing through the center of the piston, having a reduced portion for this purpose and locked in place by means of a nut 8.

An expansible annular tube 9 is disposed in the groove 6 and circumjacent this tube 9 is a split expansible piston ring 10 which will be forced out against the liner of the cylinder as is clearly indicated in the drawings when the tube 9 is expanded by the proper pressure.

A duct 11 is formed longitudinally in the piston rod 7 having a lateral branch 12 with a hollow plug 14 threaded therein to receive a hollow nipple 15 from the tube 9. At the other end the duct 11 is provided with a branch 16 in which is disposed a suitable check valve 17.

Thus the tube 9 may be inflated to the desired pressure either by means of gases, liquids or mechanical means. As the method and use and operation of the device is thought to be clear from the above description, further detailed discussion thereof is thought to be unnecessary. It is, therefore, believed that the present invention provides a simple and practical device adapted to accomplish, among others, all the advantages and objects above set forth.

Without further analysis, the foregoing will so fully reveal the gist of this invention that others can by applying current knowledge readily adapt it for various application without omitting certain features that, from the standpoint of the prior art, thoroughly constitute essential characteristics of the generic or specific aspect of the invention, and therefore such adaptation should and is intended to be comprehended as to fall within the meaning and range of equivalency of the following claim.

Having thus described my invention, what I claim as new is:

A pump piston of the character described comprising a rod having a reduced end portion providing a shoulder, said reduced portion having a threaded free end portion, the rod further having a longitudinal duct therein extending from the unreduced portion into the reduced portion thereof and terminating in angular, threaded end portions communicating with the periphery of the rod, a piston having a circumferential channel therein and comprising a pair of complementary half sections mounted on the reduced portion, a nut threaded on the threaded portion and in conjunction with the shoulder, constituting means for clamping the sections together in position on the reduced portion, a hollow flanged plug extending through the abutting sides of the sections and threaded into the adjacent end portions of the duct, an angular inflatable tube disposed in the channel, a nipple anchored in the tube and extending therefrom into the plug for establishing communication between the tube and the duct, and a check valve threaded into the other end portion of the duct.

In testimony whereof I affix my signature.

ODIE L. HASTINGS.